Aug. 1, 1967 WAGI KOBAYASHI 3,333,928
PROCESS FOR MANUFACTURING CARBON BLACK
Filed July 5, 1963 2 Sheets-Sheet 1

United States Patent Office 3,333,928
Patented Aug. 1, 1967

3,333,928
PROCESS FOR MANUFACTURING CARBON BLACK
Wagi Kobayashi, Niigata, Japan, assignor to Asahi Kabon Kabushiki Kaisha, Niigata, Japan
Filed July 5, 1963, Ser. No. 292,879
Claims priority, application Japan, July 12, 1962, 37/29,291; Aug. 18, 1962, 37/35,820; Sept. 22, 1962, 37/41,709
4 Claims. (Cl. 23—209.6)

This invention relates to a process for manufacturing carbon black in accordance with a furnace process using, for instance, oily hydrocarbon as a starting material, the black being especially a novel, useful carbon black of high electric conductivity and having an excellent characteristic as a rubber reinforcing ingredient.

Hitherto, the manufacture of electrical conductive carbon black of the type referred to above is limited exclusively to a so-called acetylene process wherein an expensive acetylene is used as a starting material. The carbon black obtained serves the important role of furnishing the rubber industry with a reinforcing ingredient and thus attributes to development of the modern rubber industry, as is generally known. In consequence of carbon black demand, exhaustive investigations have been conducted in reference to its manufacture and as a result many types of carbon black are manufactured and marketed at the present.

From the foregoing, it may be surmised that there have been developed a number of methods for making carbon black which have generally been performed and roughly classified in three kinds: a channel process, a furnace process, and a thermal decomposition process. The process according to the present invention belongs to the furnace process which is contemplated to make a high grade product at high yield from a wide range of starting materials.

According to the process of the present invention, using an inexpensive and easily available raw material, e.g. straightly or catalytically cracked oil distillate, extract oil, and bottom oil, it is possible to manufacture carbon black of high electrical conductivity at high yields. The essential feature of the process lies in the manufacturing of carbon black in three steps described hereinafter wherein the advance of carbonizing reaction of raw materials is controlled by utilization of a uniquely designed reaction furnace.

Furthermore, according to the present invention, a carbon black is produced having properties normally associated with black resulting from the channel type process; that is, fine grained and of low development of structure. Thus carbon black with normally desired properties is produced at high yields in a process that is greatly improved over processes utilizing conventional type furnaces.

Other objects and advantages of this invention will be readily appreciated as the same becomes better understood by reference to the following detailed description when considered in connection with the accompanying drawings wherein.

Figure 1:
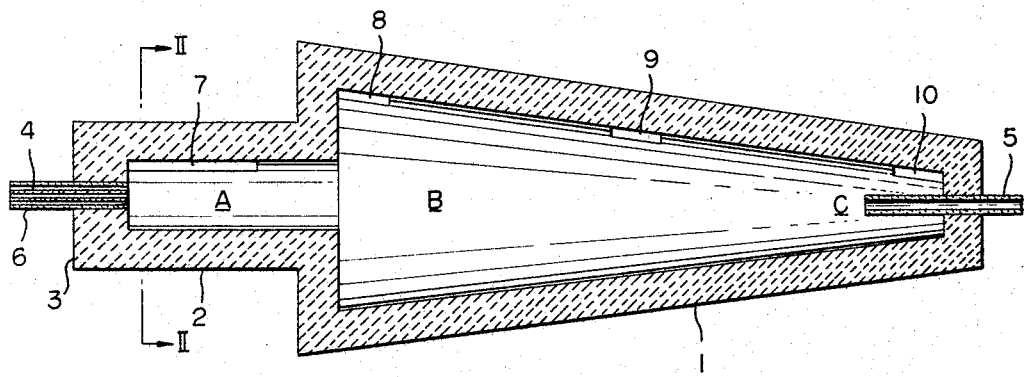
FIG. 1 represents a side elevation of the said furnace in longitudinal section.
Figure 2:
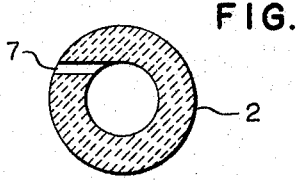
FIG. 2 represents a sectional front view of FIG. 1 on line II—II.

Generally, according to the known furnace process, raw material is blown axially in foggy mist or spray from one extremity of an extended cylindrical furnace, while air is introduced tangentially at the same end of said furnace along the cylindrical wall for combustion. The combustion product is transgressed toward the other end of the furnace, while being revolved spirally along the inner wall of the furnace. A reaction furnace of so-called helical combustion type is employed for the furnace, with the necessary quantity of air varying from 3 to 7 times, by weight, the amount of raw material used in the customary practice. The process according to the present invention utilizes a furnace as illustrated in FIGS. 1 and 2 which is a new furnace construction in comparison with the cylindrical, well-known type furnace referred to above. The novel reaction furnace is, as a whole, constructed from refractory material and has a narrow, transversal, hollow, conical body 1, from one side of which a small radius cylindrical body 2 is protruded, said cylindrical body being provided with a nozzle 4 on the end wall 3 and pierced with a horizontal effluent delivery pipe 5 on the opposite end wall, the front end of said delivery pipe being extended into the furnace.

A portion A of the small radius cylindrical body 2 constitutes a primary reaction chamber, the portion B of conical body 1 an intermediate reaction chamber, and the remaining portion C of body 1 is a final reaction chamber. The oily hydrocarbon or other raw material to be fed into the furnace is subjected to a distinctive reaction in each of said furnace chambers A, B, and C. For example, the temperature of the reaction product in the chamber A is lowered quickly by markedly increasing the volume ratio $B/A$ with the progress of carbonizing reaction in the chamber B being slowed and controlled, while the temperature of chamber C is raised by decreasing the volume ratio $C/B$ markedly to resume the chemical reaction and complete the reaction.

Referring to the construction of the chamber A, the nozzle 4 is a tube, accommodated within an air tube 6, through which raw material is sprayed in the chamber A. Further, a suitable amount of air is forced through an air inlet 7 into the chamber A along the furnace wall, so that reaction material may be vigorously turned in a helical path in the chamber A. It is important, in this case, to choose an appropriate condition for the raw material to perform an imperfect combustion in the chamber A. Therefore, the reaction in this stage is dependent on the kind of raw material and amount of air supplied through said air inlet 7. In general, the amount of air supplied corresponds about 30% of the amount necessary for effecting a perfect combustion of raw material and the reaction temperature reaches then only to approximately 1100° C.

The construction of the chamber B is as shown in FIG. 1. The size of the chamber B is markedly larger than that of the chamber A, and the capacity of the chamber B is extremely larger as compared with that of the chamber A; that is, the chamber B is rapidly enlarged from the chamber A. For this reason, the flow of reactants in the chamber A shifts to the chamber B and reduces rapidly the mixing degree of reactants in the chamber B, because of the adiabatic expansion of the reactants upon entering the chamber B. Actually, the temperature is lowered to about 800° C. Thus, chamber A provides the means for a simple thermal decomposition of the reactants while chamber B provides the means for a rapid change of temperature of such reactants when first entering chamber B. The rapid change to a lower temperature retards the further combustion of the reactants at that time whereby the hydrocarbons are decomposed in steps; the progressive decomposition aids in the development of the structure of the carbon black whereby the property of electrical conductivity of the resulting product is achieved.

The construction of the chamber C will now be described. The chamber C is provided for performing an appropriate after-treatment in accordance with the primary reaction. The size of the chamber C is small as compared with that of the chamber B, and any suitable number of pipes 5 are inserted through the interior of the chamber C for the discharging of reactants, with the front ends of said pipes extending to some extent in the chamber C. By being so designed, the chamber C provides a flow path for the reactants that is reduced to a size smaller than that of chamber B whereby the reactants again resume carbonization. In the actual measurement, the temperature raised above 1200° C. in chamber C.

Thus, carbonization is completed by such an operation as referred to above, and thereafter the resulting reactant is discharged out of the furnace, and the thus produced carbon black is separated and collected according to an ordinary method. In order to remove the deposition of tar from surfaces of furnace walls or to control a reaction temperature, whenever needed, inlet holes 8, 9 and 10 are formed at appropriate positions in the chamber A and chamber B, through which inlet holes 8, 9 and 10 an appropriate amount of air may be introduced in the furnace. Moreover, the furnace is made of a conical frustum form for the purpose of moving reactants in the chambers A and B toward the chamber C, the final reaction zone, in uniform order without the direction of moving being disturbed.

In brief, according to the process of this invention the quantity of air introduced in the jet portion of raw material oil is so adjusted that the raw material oil and air mixture may be in an imperfect combustion condition in chamber A. Next, carbonization is controlled by rapidly changing the temperature of reactants in the first stage due to adiabatic change in chamber B, and thereafter, the carbonization is resumed in the final stage. By such a treatment, the structure of the produced carbon black is developed suitably to the end that a carbon black of excellent electrical conductivity as well as thermal conductivity may be obtained at high yields.

Moreover, the process according to this present invention is an extremely economically advantageous process as compared with usual processes, since oily hydrocarbon, which is of low cost and easily available, is used as a raw material. Also, in connection with usages, as used either alone or as an ingredient in rubber or plastics, the carbon black produced from the process of the present invention may display an excellent effect in comparison with usual products. The carbon black from the process of the present invention is compared favorably with acetylene black in various characteristics as illustrated in the following table:

CHEMICAL ANALYSIS

|  | Product of the present process | Acetylene |
|---|---|---|
| Amount of liquid: |  |  |
| Spindle oil(d=0.9, cc./gm. | 7.5 | 4.9 |
| 2N. HCl, cc./5 gm. | 20.8 | 17.6 |
| 10% acetone | 25.6 | 24.0 |
| pH | 6.65 | 6.90 |
| Electroresistance, Ω-cm. at 30 kg. | 0.161 | 0.187 |
| Iodine adsorption, mg./gm. | 48.72 | 98.25 |
| Ash, percent | 0.11 | 0.17 |
| Moisture, percent | 0.50 | 0.40 |
| Apparent sp. gr. | 0.036 | 0.047 |

BLENDING TEST ON EPOXY RESIN

| Kind | Product of the present process, Ω-cm. | Acetylene black, Ω-cm. |
|---|---|---|
| Blending ratio: |  |  |
| Carbon black, 0.5 gm. Resin, 10 gm. | 27.2 | 52 |
| Carbon black, 1.0 gm. Resin, 10 gm. | 4.9 | 16.1 |
| Carbon black, 1.5 gm. Resin, 10 gm. | 3.8 | 7.0 |

BLENDING TEST ON SILICON RESIN

| Kind | Product of the present process, Ω-cm. | Acetylene black, Ω-cm. |
|---|---|---|
| Blending ratio: |  |  |
| Carbon black, 0.5 gm. Resin, 10 gm. | 11.6 | 17.0 |
| Carbon black, 1.0 gm. Resin, 10 gm. | 2.5 | 5.0 |
| Carbon black, 1.5 gm. Resin, 10 gm. | 2.8 | 2.8 |

Furthermore, data of manufacture are shown below which are typical of the embodiment of this invention:

Raw material (oily hydrocarbon):
Specific gravity ($d_4^{15}$) _____ 1.028
Viscosity (RIS@50° C.) _____ 34.8
Flash point (PM CC ° C.) _____ 73
Residual carbon, percent _____ 7.8
Sulfur, percent _____ 0.03

Condition of manufacture: kg./hr.
Amount of raw material ejected nozzle 4 _____ 120
Amount of air for oil jet inlet tube 6 _____ 120
Amount of air supply in the chamber A hole 7 _ 480
Amount of air supply in the chamber B, C hole 8 _____ 80
Amount of air supply in the chamber B, C hole 9 _____ 120
Amount of air supply in the chamber B, C hole 10 _____ 120

Condition of temperature: ° C.
Chamber A inlet _____ 105
Chamber A outlet _____ 1120
Chamber B front _____ 820
Chamber B rear _____ 950
Chamber C _____ 1280
Yield—43.8%.

Figure 3:
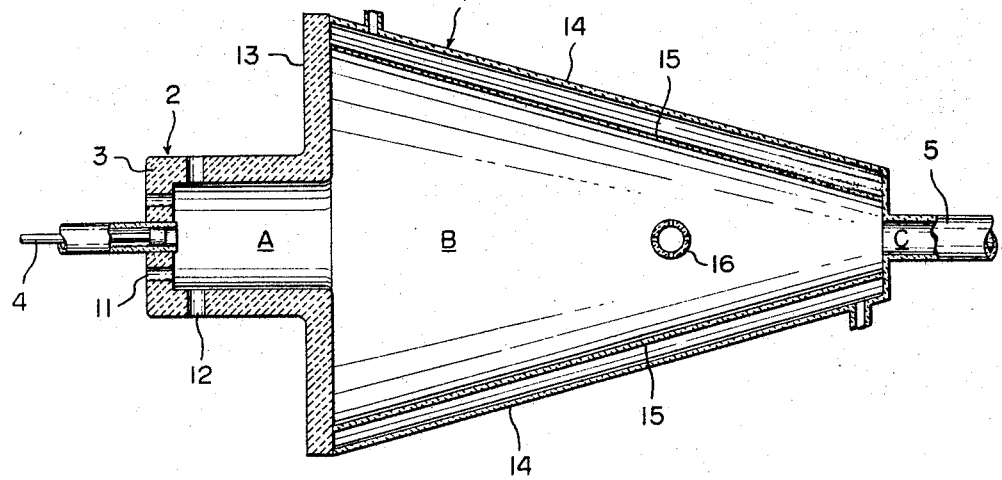
FIG. 3 is a side view of another modification of said furnace in longitudinal section.

Another modification of reaction furnaces suitable for practicing the present invention is illustrated in FIG. 3. In this case, a chamber A is constructed from a small radius cylindrical body 2, on the end wall 3 of which a nozzle 4 for raw material is provided as in the previous example, and a suitable number of air inlets 11 are formed along the periphery of said nozzle. Also, on the outer periphery of small radius cylindrical body 2 any suitable number of other air inlets 12 are formed and the open end of said small radius cylindrical body is joined with a flanged wall 13. A double-walled frusto-conical body 14, 15 is provided in connection with said flanged wall. Accordingly, the chamber A is communicated with chamber B by being so constructed. Said chamber B is intermittently cooled by passing cold water between said double walls, and direct cooling is made possible by providing a water nozzle 16 opening onto the interior.

The chamber C is connected to the end of chamber B and serves as a flue for the separation and collection of reaction products according to the ordinary process. The device for separating and collecting products are well known and consequently no need of further detailed explanation.

When the reaction is effected by using a reaction furnace having said construction, the oily hydrocarbon ejected from the nozzle 4 into the reaction chamber A is mixed with the air introduced from the air inlets 11, 12 (the air is preferably introduced from 11 linearly and from 12 in crosswise direction) and rapidly burnt in turbulent condition to complete the carbonization in a short period of time. In this case, the temperature of the furnace becomes above 1400° C. As a result, the amount of introduced air is required to be approximately two times the amount of air required by an ordinary furnace process. The oxygen not reacted in the chamber A is shifted with the combustion gas stream to the chamber B.

When combustion gases shift to the chamber B, an adiabatic expansion takes place due to a rapid enlargement in volume and bore of the chamber B, and a rapid fall of temperature is recognized (according to the actual measurement, it fell down below 600° C.). If necessary, the surrounding of the chamber B is cooled by passing water between the walls 14 and 15. Further cooling is accomplished, if needed, by the water nozzle 16 provided in the interior. The combustion loss of carbon black produced in the chamber A is avoided and the further development in the structure of carbon black also is interrupted by the adiabatic expansion and indirect cooling.

As shown in the following table on gas analyses in comparsion with the result from the ordinary furnace process, $CO_2$ production is increased, and the unreacted oxygen in the chamber A reacts in the chamber B with CO and $H_2$ produced in the chamber A, to become $CO_2$ and $H_2O$.

In the process of the present invention, a large amount of air is introduced, but since the reaction time is shortened and a rapid cooling is attainable, a large yield of superior product is obtained.

In the following tables, various operational conditions are described for a reaction furnace of the form illustrated in FIG. 3:

Used raw materials (oily hydrocarbon):
  Specific gravity _____ 1.016
  Viscosity, 15° C. _____ 18
  Residual carbon, percent _____ 5.2
  Beginning point, ° C. _____ 185
  End point, ° C. _____ 386

Conditions of manufacture:
  Charge of raw material, kg./hr. _____ 120
  Preheating temperature of raw material, ° C. __ 150
  Charging air (11) kg./hr. _____ 600
  Charging air (12) kg./hr. _____ 850

Distribution of temperature of the furnace: ° C.
  Chamber A front portion _____ 1550
  Chamber A rear portion _____ 1480
  Chamber B front portion _____ 520
  Chamber B rear portion _____ 680
  Chamber C _____ 610
Yields—51.6%.

Quality test on products:
  Average diameter of grains _____ A__ 290
  Oil suction amount _____ cc./gm__ 1.38
  Iodine adsorption _____ mg./gm__ 180
  Acetone extract, percent _____ 0.66
  pH _____ 6.2

The test results on natural rubber after blended with 50 parts of above-mentioned product (JISK 6301):

The chemical analysis of produced gas is shown on the following table, and it is noted that the composition of effluent gas is entirely distinguished from that of ash gas. This indicates that the production reaction is highly effective.

|  | $CO_2$ (percent) | CO (percent) | $H_2$ (percent) | $N_2$ (percent) | $O_2$ (percent) |
| --- | --- | --- | --- | --- | --- |
| Usual method | 3–5 | 11–13 | 18–23 | 65–68 | 0–0.2 |
| Present process | 9–14 | 2–7 | 0 | 71–87 | 0–0.5 |

Figure 4:
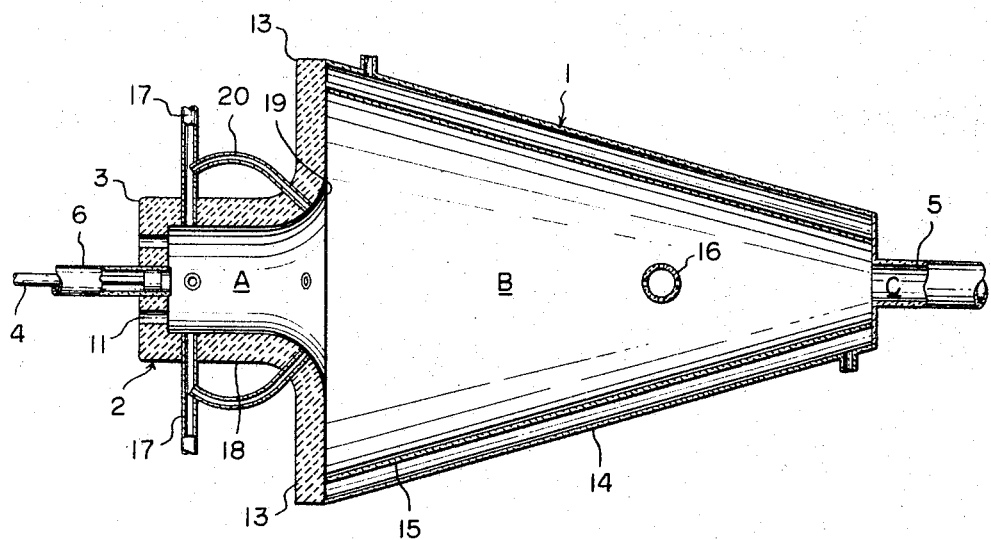
FIG. 4 is a further modification of said furnace in longitudinal section.

A further modification of the reaction furnace appropriate for practicing the process of the present invention is shown in FIG. 4. In this instance, a suitable number of air inlet tubes 17 are radially provided along the outer periphery of the small radius cylindrical body 2. The free end of walled portion 18 of said small radius cylindrical body is in contact with the flanged wall 13 through the curved face 19. Further, the front end of a suction tube 20 opening onto the curved face is inserted in the air inlet direction and is in communication with the air inlet tube 17 opening to said wall portion 18. The remaining portions are similar to the reaction furnace shown in FIG. 3.

When the reaction is performed in a reaction furnace having above-mentioned construction, oily hydrocarbon ejected from the nozzle 4 in the reaction chamber A is mixed with the air introduced from the air inlet 11 and the air feed pipe 17 and the carbonization is completed in an extremely short time interval by a rapid combustion of the mixture in a turbulent condition.

The first characteristic of the present embodiment is that the front end of suction pipe 20 opening into the final end of chamber A where the carbonization is completed, is inserted to connect with the air feed pipe 17. Thus, the heat at the end of reaction chamber A is introduced into the air under pressure in the air feed pipe 17. The air drawn from pipe 17 into chamber A will thus be preheated. Since the temperature of the reaction chamber A is increased by the introduction of the preheated air, the reaction in chamber A is completed more quickly. The temperature rises in chamber A to at least above 1500° C. In addition, agitation of air flow is promoted by said suction, and as a result, the reaction is improved and the diffusion is also improved as described hereinafter. A second characteristic of the present embodiment is rapid diffusion of combustion gas enhanced by the connecting face 19 between the wall portion 18 of reaction chamber A and flanged wall 13 along which curved face 19 the flow of combustion gas is guided to flow instead of allowing the flow linearly to enter the chamber B where it is to be cooled. Accordingly, the fall of temperature due to adiabatic expansion is improved and assured. Further, the surrounding of chamber B is cooled by water passed between walls 14 and 15, whenever needed. Furthermore, the chamber B may be directly cooled by the water nozzle 16 arranged in the interior of the chamber.

Various conditions when a reaction furnace having the shape as shown in FIG. 4 are as below:

Raw material used (oily hydrocarbon):
  Specific gravity _____ 1.016
  Viscosity _____ ° C__ 18

| Mooney viscosity (15/4) | Curing time (min.) | Modulus of elasticity (300%) | Tensile strength (kg./cm.²) | Elongation (percent) | Hardness (JIS) | Tear resistance (kg./cm.²) | Abrasion loss (William) (cc./HpH) |
| --- | --- | --- | --- | --- | --- | --- | --- |
| 48/40 | 20 | 110 | 320 | 570 | 65 | 110 | 22 |
|  | 30 | 125 | 300 | 530 | 68 | 118 | 28 |
|  | 40 | 128 | 290 | 500 | 68 | 98 | 25 |

Raw material used (oily hydrocarbon):—Continued
  Residual carbon, percent _____ 5.2
  Distillation beginning pt., _____° C__ 185
  End point _____° C__ 386
Conditions of manufacture:
  Amount of raw material charged kg./hr. _____ 120
  Preheating temperature for raw material ° C__ 150
  Amount charging air from (11) kg./hr. _____ 450
  Amount charging air from (17) kg./hr. _____ 650
Distribution of temperature in the furnace:
  Chamber A (front portion) _____° C__ 1,620
  Chamber A (rear portion) _____° C__ 1,400
  Chamber B (front pirtion) _____° C__ 720
  Chamber B (rear portion) _____° C__ 550
  Chamber C _____° C__ 480
Yields—48.0%.
Quality test on products:
  Average diameter of particles _____A__ 320
  Oil absorption _____cc./g__ 1.35
  Iodine adsorption _____mg./g__ 205
  Acetone extracted, percent _____ 0.55
  pH _____ 6.8

The test results on natural rubber after blended with 50 parts of above-mentioned products (JISK 6301):

| Mooney viscosity (15/4) | Curing time (min.) | Modulus (300%) | Tensile Strength (kg./cm.²) | Elongation percent | Hardness (JIS) | Tear resistance (kg./cm.²) | Abrasion loss (William) (cc./HpH) |
|---|---|---|---|---|---|---|---|
| 46/42 | 20 | 115 | 340 | 570 | 69 | 115 | 25 |
|  | 30 | 120 | 320 | 530 | 72 | 110 | 28 |
|  | 40 | 135 | 290 | 500 | 75 | 110 | 25 |

Further, the analysis on effluent gas is as follows, and it is noted the composition of off gas is entirely distinguished from that of ash gas indicating that the production reaction is remarkably distinguished.

| | $CO_2$ (Percent) | CO (Percent) | $H_2$ (Percent) | $N_2$ (Percent) | $O_2$ (Percent) |
|---|---|---|---|---|---|
| Usual method | 3-5 | 11-13 | 18-23 | 65-68 | 0-0.2 |
| Present method | 8-16 | 1-6 | 0 | 74-89 | 0 |

It is manifest that the above-described embodiments of the invention are merely illustrative, and that numerous modifications may be made within the spirit and scope of the invention.

What is claimed is:

1. A process for manufacturing carbon black comprising steps of introducing hydrocarbons together with a free oxygen containing gas under pressure into a cylindrical first reaction chamber wherein combustion of the hydrocarbons is maintained in an incomplete state by adjusting the amount of gas fed to the first chamber, feeding the reactants from the first chamber into a frusto-conical cylinder which is communicated with the first chamber at the base of the frusto-conical cylinder which base is of larger diameter than that of the first chamber such that the temperature of the reactants is lowered by the effect of rapid adiabatic expansion, passing the reactants through the reduced diameter zone of said frustro-conical cylinder whereby the temperature of said reactants is increased by compression thereof to complete the carbonization reaction, and drawing out the resulting products through a small diameter conduit, one end of which is projected into said reduced diameter zone.

2. A process as in claim 1 wherein air is fed tangentially into the frusto-conical cylinder at spaced axial points to remove deposition of tar from walls of the cylinder.

3. A process as in claim 1 wherein the hydrocarbon is fed axially into the first cylindrical chamber and is progressed axially through the frusto-conical cylinder from the first chamber and the product is withdrawn axially from the frustro-conical cylinder, the first cylindrical chamber, the frusto-conical cylinder and the conduit being aligned axially.

4. A process for the manufacture of carbon black comprising the steps of introducing and burning a hydrocarbon incompletely in a first chamber, retarding the combustion of the reactants by lowering the temperature thereof by adiabatic expansion of said reactants in a second chamber, passing the reactants to a third chamber of reduced size whereby the temperature of said reactants is increased by compression thereof to complete the carbonization reaction, and withdrawing the resulting product from said third chamber, the flow of reactants through the first, second and third chambers being unidirectional and continuous.

References Cited
UNITED STATES PATENTS 2,790,838   4/1957   Schrader _____ 260—679
2,967,762   1/1961   Krejci _____ 23—209.6
2,985,698   5/1961   Pechtold et al. _____ 260—679 X OSCAR R. VERTIZ, *Primary Examiner.*

E. J. MEROS, *Assistant Examiner.*